(12) United States Patent
Nervo et al.

(10) Patent No.: US 9,457,619 B2
(45) Date of Patent: Oct. 4, 2016

(54) HUB FOR A MOTOR VEHICLE WHEEL

(71) Applicants: Aurelio Nervo, Turin (IT); Davide Antonio Olivieri, Turin (IT); Laura Sguotti, Pinerolo (IT)

(72) Inventors: Aurelio Nervo, Turin (IT); Davide Antonio Olivieri, Turin (IT); Laura Sguotti, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/517,768

(22) Filed: Oct. 17, 2014

(65) Prior Publication Data

US 2015/0108826 A1 Apr. 23, 2015

(30) Foreign Application Priority Data

Oct. 17, 2013 (IT) .............................. TO2013A0841

(51) Int. Cl.
*B60B 27/00* (2006.01)
*B60B 5/02* (2006.01)
*F16C 19/18* (2006.01)

(52) U.S. Cl.
CPC ................ *B60B 27/00* (2013.01); *B60B 5/02* (2013.01); *B60B 27/0005* (2013.01); *B60B 27/0084* (2013.01); *B60B 2310/204* (2013.01); *B60B 2310/314* (2013.01); *B60B 2310/3142* (2013.01); *B60B 2310/321* (2013.01); *B60B 2360/102* (2013.01); *B60B 2360/141* (2013.01); *B60B 2360/144* (2013.01); *B60B 2360/1442* (2013.01); *B60B 2360/32* (2013.01); *B60B 2380/73* (2013.01); *B60B 2380/75* (2013.01); *B60B 2380/82* (2013.01); *B60B 2900/111* (2013.01); *B60B 2900/112* (2013.01); *B60B 2900/141* (2013.01); *B60Y 2200/11* (2013.01); *F16C 19/185* (2013.01); *F16C 2326/02* (2013.01)

(58) Field of Classification Search
CPC ..................................................... B60B 27/00
See application file for complete search history.

(56) References Cited

U.S. PATENT DOCUMENTS

2010/0209034 A1* 8/2010 Masuda .................... B21K 1/12
384/544
2014/0233876 A1* 8/2014 Ishikawa ............... F16C 33/588
384/477

* cited by examiner

*Primary Examiner* — Jeffrey J Restifo
*Assistant Examiner* — Erez Gurari
(74) *Attorney, Agent, or Firm* — Bryan Peckjian; SKF USA Inc. Patent Dept.

(57) ABSTRACT

A hub for a motor vehicle wheel provides a cylindrical portion that extends in an axial direction, and a flange extending in a radially outer direction from an axially outer end of the cylindrical portion. The hub includes a core of metallic material which extends into the cylindrical portion and in the flange of the hub, and a covering body of plastic material applied over the core.

14 Claims, 6 Drawing Sheets

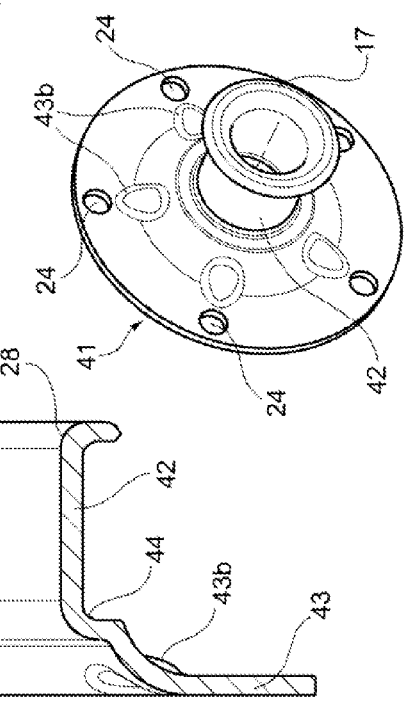
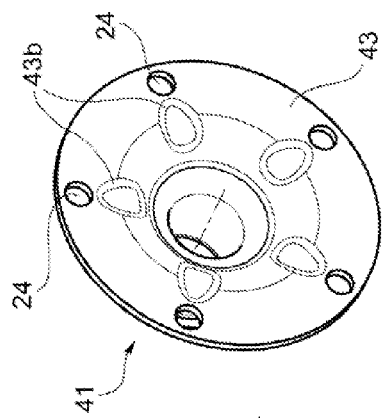
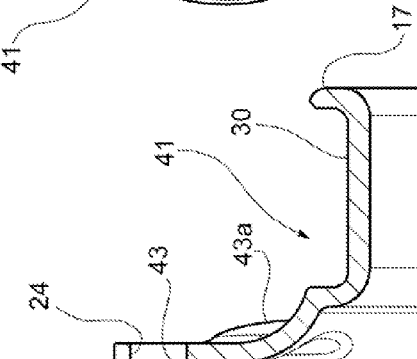
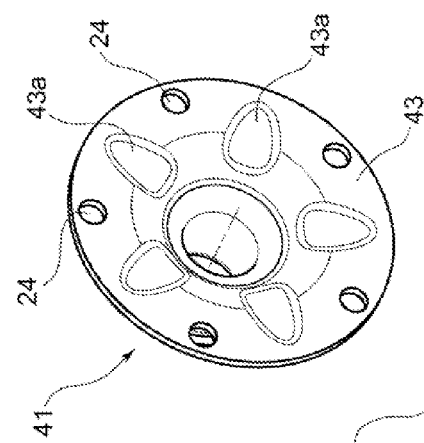
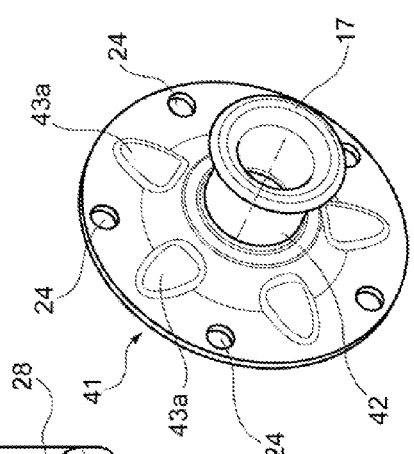
FIG. 4a  FIG. 4b  FIG. 4c  FIG. 5a  FIG. 5b  FIG. 5c

HUB FOR A MOTOR VEHICLE WHEEL

FIELD OF THE INVENTION

The present invention refers to a hub for a motor vehicle wheel.

BACKGROUND OF THE INVENTION

The motorcar industry is facing an ever increasing demand for weight reduction in motor vehicle components for the sake of cutting down fuel consumption and exhaust emissions. In order to reduce the overall weight of the wheel and, in particular of the rotating mass, in recent years different solutions have been proposed. For example, hub bearing assemblies have been proposed, having a rotatable flanged ring composed of two different materials joined together in a single piece. In such rings, a tubular core made of a first, high toughness material, such as bearing grade steel, forms the rolling races; a second lightweight material, such as a lightweight metal, forms the remaining part of the ring, including an outer flange for mounting the wheel. In general, known solutions are affected by relatively high costs with respect to both employed materials and production processes.

EP 1 859 958 A1 discloses a hub having a core of metallic material and a covering body of composite material.

WO 2010/105644 A1 and WO 2010/063299 A1 disclose hubs having a core and a covering body of different metallic materials.

WO 2011/127979 A1 discloses a hub having a core of metallic material and a covering body of reinforced polymer. The core does not extend into the flange of the hub.

WO 2012/003848 A1 discloses a hub having a core and a covering body of different metallic materials. The core does not extend into the flange of the hub.

WO 2012/122993 A1 discloses a hub at least partially formed by metallic lightweight material. Such metallic material comprises a reinforcement fiber.

EP 2 078 619 A1 discloses a spoked hub.

DE 10 2010 048397 A1 discloses a hub wherein at least the flange is of optionally reinforced, plastic material.

EP 2 468 528 A1 discloses a hub having a core of metallic material and a polymeric covering body. The core does not extend into the flange of the hub.

SUMMARY OF THE INVENTION

An object of the invention is therefore to decrease the overall weight of an hub.

A further object is to decrease the cost of starting materials and the production costs of an hub.

According to a first aspect, the invention realizes a hub bearing assembly for a motor vehicle wheel comprising a hub as defined in claim 1 or the claims dependent thereon. Preferred embodiments of the invention of the invention are defined in the dependent claims.

BRIEF DESCRIPTION OF THE DRAWINGS

A few preferred embodiments of the invention will now be described with reference to the accompanying drawings, wherein:

FIGS. 4a to 4c are views in axial cross-section, in perspective from one side and in perspective from the opposite side, respectively, of a core of the hub of FIG. 1;

FIGS. 5a to 5c are views in axial cross-section, in perspective from one side and in perspective from the opposite side, respectively, of a core of a hub according to a second exemplary embodiment of the present invention;

DETAILED DESCRIPTION OF THE INVENTION

Figure 2:
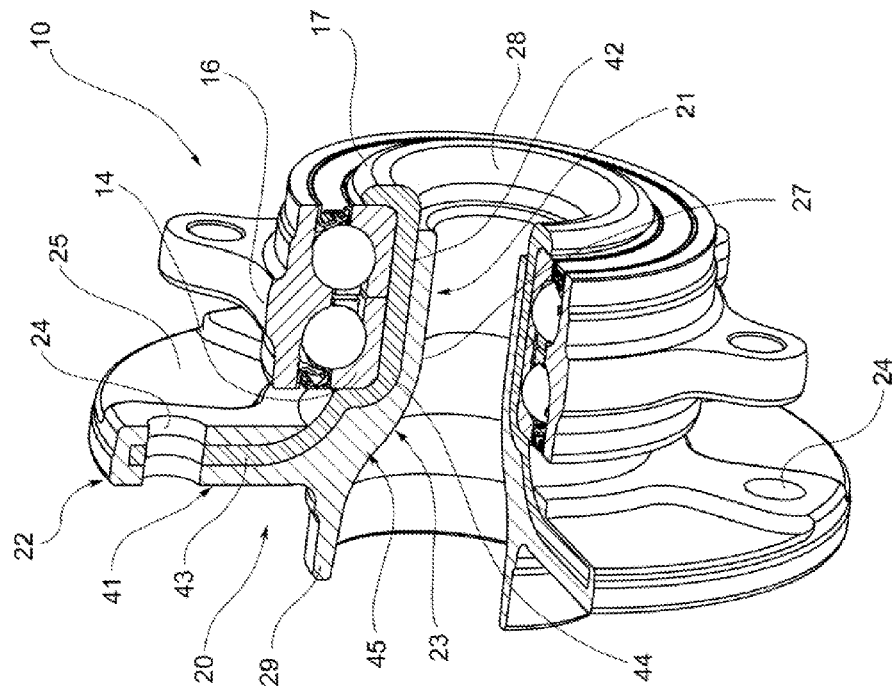
FIG. 2 is a partially sectioned, perspective view of the assembly of FIG. 1.
Figure 1:
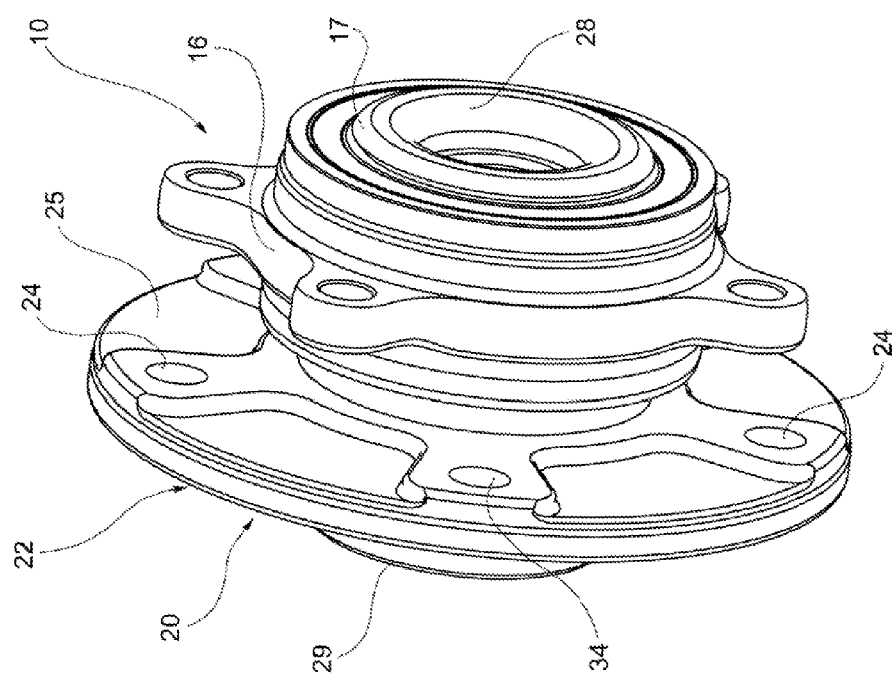
FIG. 1 is a perspective view of an hub bearing assembly which incorporates a hub according to an exemplary embodiment of the present invention.
Figure 3:
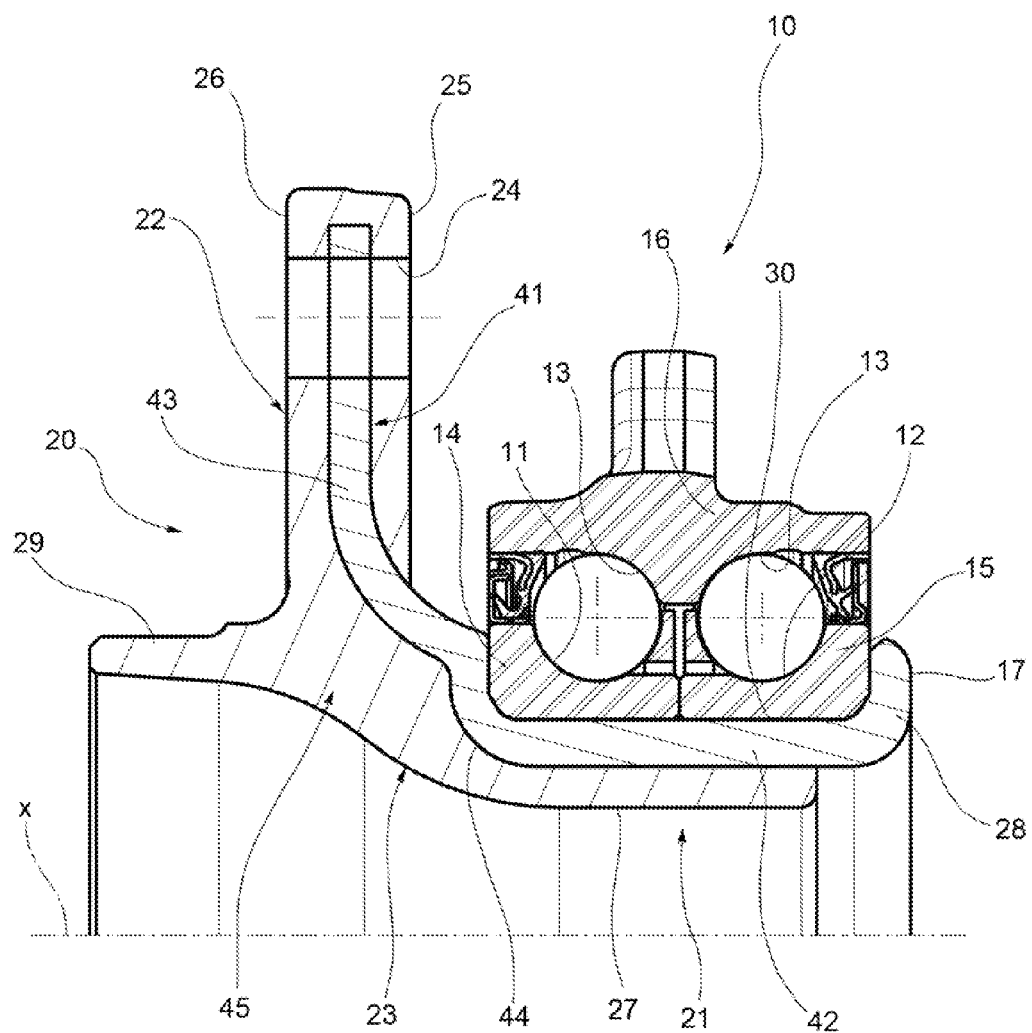
FIG. 3 is an axially sectioned view of the hub bearing assembly of FIG. 1.

Referring initially to FIGS. 1 to 3, numeral 10 designates overall a hub bearing assembly for a motor vehicle wheel. The assembly 10 defines a central rotation axis x and is adapted to rotatably mount a motor vehicle wheel (not shown) about the axis x.

The hub bearing assembly comprises a stationary outer bearing ring 16, which in use is connected to a standard (not shown) of the vehicle suspension, and two radially inner bearing rings 14, 15, axially side by side or adjacent to each other and rotatable with respect to the outer bearing ring 16. In the example as shown, the hub bearing assembly is of a kind having a double crown of rolling elements interposed between respective inner rolling races 11, 12 and outer rolling race 13 provided by the rings 14, 15 and 16, respectively.

Throughout the present description and claims, the terms and expressions indicating positions and directions such as "radial", "axial", "transversal", shall be construed as referring to the axis of rotation x. Expressions such as "axially inner" (or "inboard") and "axially outer" (or "outboard") refer to a condition mounted on the vehicle.

The assembly 10 comprises a hub 20, which comprises a cylindrical portion 21 extending in an axial direction, and a flange 22 extending in a radially outer direction from an axially outer end 23 of the cylindrical portion 21. Constitution of the hub 20 will be described in detail thereinafter.

The flange 22 serves to mount a wheel (not shown) of the vehicle. Four/five axial holes 24 can be formed through the flange at positions angularly equally spaced around the axis x. The holes 24 are adapted to accommodate a corresponding plurality of fastening elements (not shown), for example bolts, for fastening the wheel. The flange provides an axially inner radial face 25, intended in use to be facing the vehicle, and an axially outer radial face 26, providing a flat supporting surface for a brake rotor (not shown) and/or the wheel of the vehicle.

The cylindrical portion or spindle 21 of the hub 20 serves to support the two radially inner bearing rings 14, 15. In the embodiment shown herewith, the cylindrical portion 21 is of tubular shape, and provides, in this example, an inner cylindrical cavity 27 extending axially. In this particular shown embodiment, the inner cavity 27 is a through hole. In other embodiments, depending on the kind of wheel to be mounted (for ex. drive or idler wheel), the cavity 27 can be a blind hole (see for example FIG. 9). In still other embodiments, the cylindrical portion 21 can be solid, namely without a cavity 27.

The numeral 28 designates an axially inner tubular end of the cylindrical portion 21. The cylindrical portion 21 provides a radially outer cylindrical surface 30. The bearing rings 14, 15 are mounted on the outer cylindrical surface 30 of the cylindrical portion 21 of the hub; on these rings respective crowns of rolling elements and the radially outer bearing ring 16 are arranged.

The tubular end 28 of the hub can be deformed in a radially outer direction thus obtaining a folded edge 17 which locks axially both bearing rings 14 and 15 in an axially preloaded condition on the hub 20. The way of mounting the bearings on the hub is known per se, and is not an object of the present invention.

The hub 20 can further form a tubular axial appendix 29 protruding on the axially outer side, that is adapted to facilitate centering of the wheel.

As can be seen in FIGS. 2 and 3, the hub 20 comprises a core 41 of metallic material which extends into the cylindrical portion 21 and the flange 22 of the hub, and a covering body 45 of plastic material applied, for example overmoulded, over the core 41. In the example of FIGS. 2 and 3, the core 41 can be of metal sheet.

The core 41 of the hub forms, as a single piece, a cylindrical core portion 42 which extends in axial direction, and a core flange 43 which extends in a radially outer direction from an axially outer end 44 of the cylindrical core portion 42. The cylindrical core portion 42 and the core flange 43 define, as a supporting/reinforcing skeleton, the cylindrical portion 21 and the flange 22 of the hub 20, respectively. Therefore, the radially outer cylindrical surface 30 which supports the bearing rings 14, 15 is provided by the cylindrical core portion 42, and the folded edge 17 which holds the bearing rings is formed on the cylindrical core portion 42. On the other side, the holes 24 that serves to mount the wheel are formed through the core flange 43.

The covering body 45 is disposed in such a way as to cover a radially inner surface of the cylindrical core portion 42; in the embodiments wherein it is provided that the cylindrical portion 21 of the hub is hollow, the covering body 45 extends radially inwardly to such an extent that it leaves the cavity 27. In the embodiments wherein it is provided that the cylindrical portion 21 of the hub is solid, the covering body 45 can be disposed in such a way as to fully occlude the inner cavity of the cylindrical core portion 42. According to a further embodiment, also the material of the core 41 can be disposed in such a way as to occlude this cavity (see for example FIG. 9).

Furthermore, the covering body 45 is disposed to fully embed the core flange 41. The core 41 is therefore covered, hence protected from the external agents, along the most part of its outer surface, except from the radially outer cylindrical surface 30 of the cylindrical portion 21 and the folded edge 17, which are provided for mounting the bearing rings 14, 15.

Preferably, the core flange 43 provides anti-slip formations axially protruding and/or recessed with respect to the core flange 43, which are adapted to prevent a relative rotation between the core 41 and the covering body 45; as a matter of fact, when the covering body 45 is applied over the core 41, they get embedded within the plastic material, and particularly alternated, in the circumferential direction, with respective portions of the covering body 45. The FIGS. 4a-4c, 5a-5c, 6a-6c and 7a-7c show respective different embodiments for these anti-slip formations. In these Figures corresponding elements are designated with the same numerals.

Figure 7B:
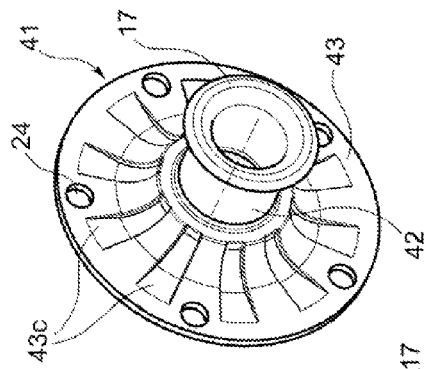
FIGS. 7a to 7c are views in axial cross-section, in perspective from one side and in perspective from the opposite side, respectively, of a core of a hub according to a fourth exemplary embodiment of the present invention.
Figure 7C:
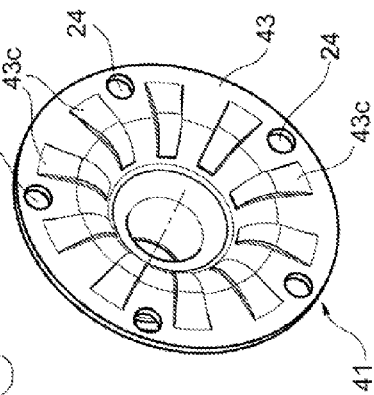
Figure 7A:
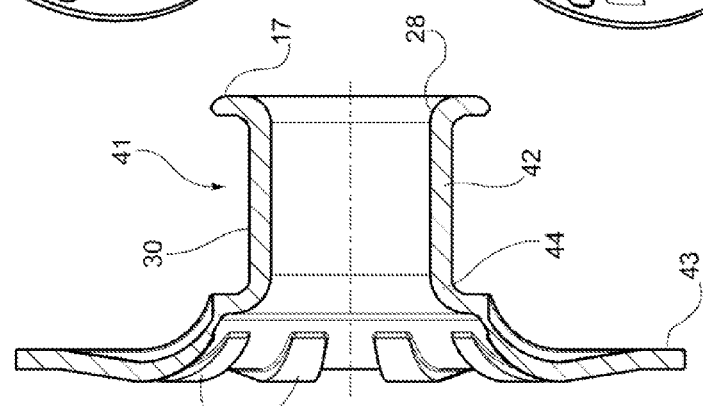
Figure 6B:
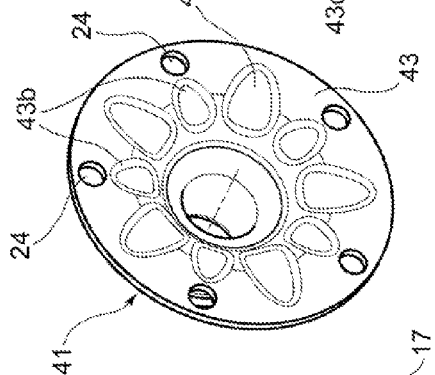
FIGS. 6a to 6c are views in axial cross-section, in perspective from one side and in perspective from the opposite side, respectively, of a core of a hub according to a third exemplary embodiment of the present invention.
Figure 6C:
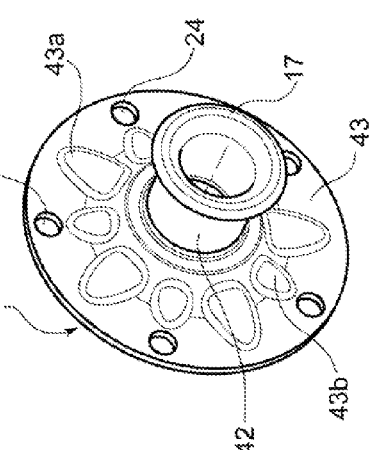
Figure 6A:
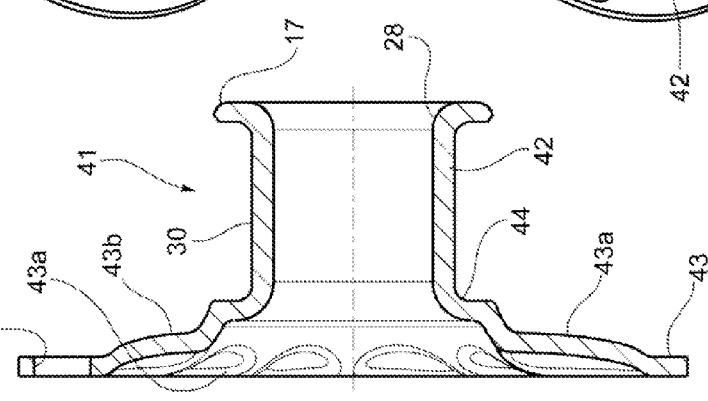

In the embodiment of FIGS. 4a-4c, the anti-slip formations are configured as bosses 43a formed on the core flange 43, which are disposed circumferentially around the cylindrical core portion 42 and angularly alternated with the holes 24. These bosses 43a form therefore projections on one side of the core flange 43, which protrude axially with respect to the core flange 43, and on the other side of the core flange 43 form recesses which are recessed axially with respect to the core flange 43. In the embodiment of FIGS. 5a-5c, the anti-slip formations are configured as bosses 43b formed on the core flange 43, which are disposed circumferentially around the cylindrical core portion 42 and angularly aligned with the holes 24. In the embodiment of FIGS. 6a-6c, the anti-slip formations are formed by two ranks of alternated bosses 43a, 43b, configured according to the previously described embodiments. In the embodiment of FIGS. 7a-7c, the anti-slip formations are configured as radial ribs 43c formed on the core flange 43, which are disposed circumferentially around the cylindrical core portion 42. These radial ribs 43c form therefore projections on one side of the core flange 43, which protrude axially with respect to the core flange 43, and on the other side of the core flange 43 form recesses which are recessed axially with respect to the core flange 43.

The tubular axial appendix 29 which protrudes on the axially outer side of the hub is advantageously even it formed by the covering body 45.

Figure 8:
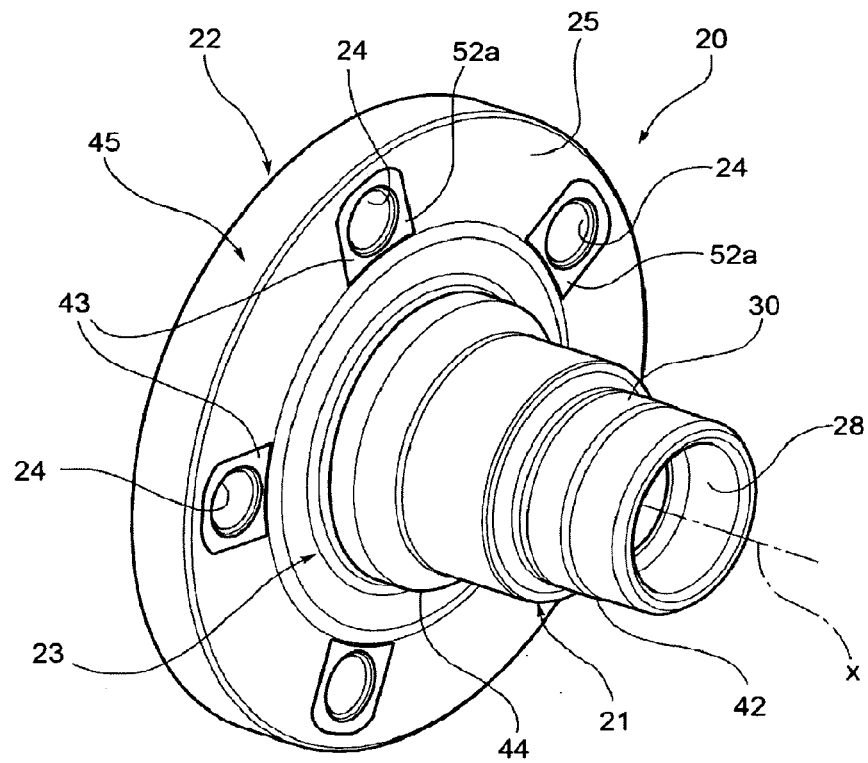
FIGS. 8 and 9 are views in perspective and in axial cross-section, respectively, of a hub according to a fifth exemplary embodiment of the present invention.
Figure 9:
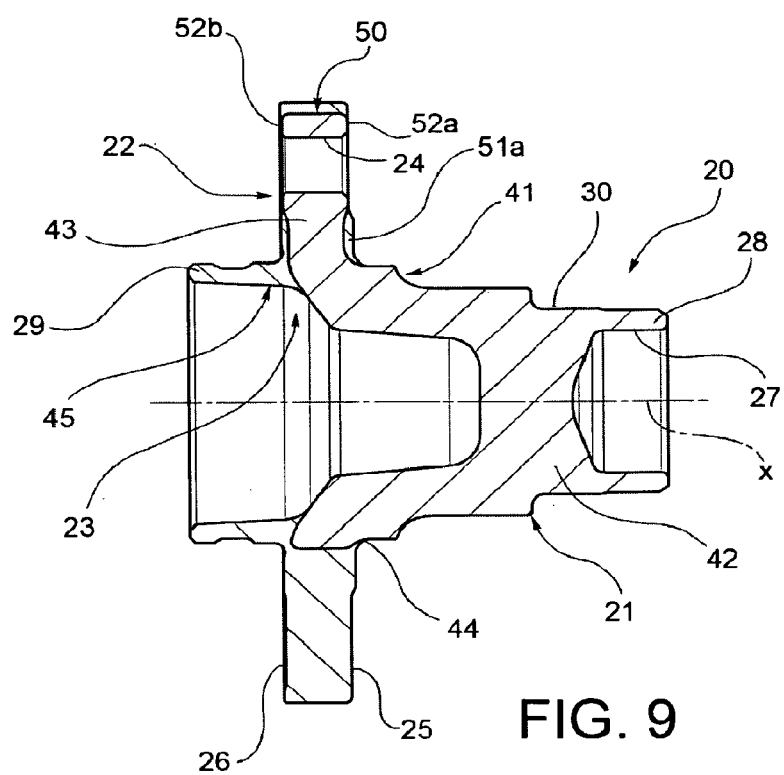
Figure 10:
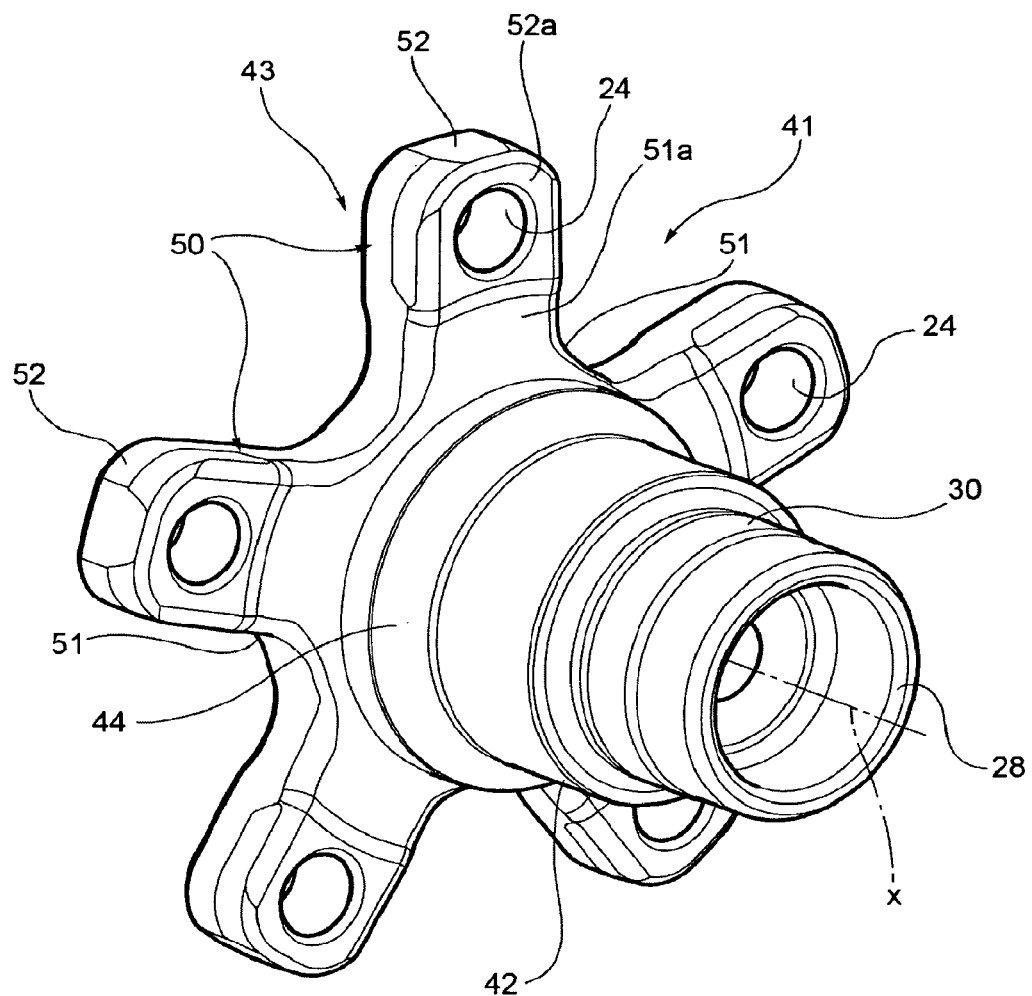
FIG. 10 is a perspective view of a core of the hub of FIGS. 8 and 9.

In the FIGS. 8 to 10 a further embodiment of the invention is shown. In these Figures, elements corresponding to those of the previous embodiments are designated with the same numerals. These elements will not be further described.

In the embodiment of FIGS. 8 to 10 the core 41 is a piece of preformed, for example forged metallic material. The core flange 43 is star shaped, and is formed by a plurality of spokes 50 which are uniformly arranged around the central rotation axis x and extend radially outwardly from the axially outer end 44 of the cylindrical core portion 42.

Each spoke 50 provides a root 51 connected directly to the axially outer end 44 and a free end portion 52 connected to the respective root 51. Each root 51 and each free end portion 52 are axially inwardly delimited by respective inner surfaces 51a and 52a transverse to the axis x, wherein the inner surface 51a of the root 51 is axially recessed with respect to the inner surface 52a of the free end portion 52. Furthermore, each free end portion 52 is axially outwardly delimited by a respective outer surface 52b transverse to the axis x and parallel to the respective inner surface 52a.

Each spoke 50 provides, furthermore, a respective hole 24 formed through the corresponding surfaces 52a and 52b, which are, as better shown in FIG. 8, coplanar and exposed to the axially inner radial face 25 and the axially outer radial face 26 of the covering body 45 of applied plastic material, respectively. The exposure of the surfaces 52a and 52b with respect to the covering body 45 of applied plastic material allows the same surfaces 52a and 52b to be used as reference surface during mounting of the hub.

With respect to the previously shown embodiments wherein the core flange was disk- or plate shaped, the embodiment just now described has the advantage, in terms of weight reduction, that the core flange 43 is lightened on non-structural portions angularly interposed between the spokes.

Elements described with respect to individual embodiments shown herewith can obviously be combined, where compatible, with elements described with respect to other shown embodiments.

The hub made of metallic material and plastic covering is advantageous in terms of weight, emissions and energy consumption; the heavier part of metallic material is disposed only where a greater strength is required. The plastic part allows the overall weight of the hub to be reduced, and advantageously allows further to protect the underlying metallic parts from the attack of the external agents, in particular from the corrosion. From a production point of view, metal sheet, which is workable with simple and economically advantageous technologies, can be preferable as metallic material for producing the core 41; plastics is applicable with normal moulding techniques.

It is understood that the invention is not limited to the embodiments described and illustrated herewith, which are to be intended as examples of the hub; it will appear to those skilled in the art that various changes may be made with respect to forms, dimensions, constructive and functional details and the configurations of elements described in the exemplary embodiments, without departing from the scope of the invention as set forth in the appended claims and their legal equivalents.

The invention claimed is:

1. A hub for a motor vehicle wheel, the hub comprising:
   a cylindrical portion that extends in an axial direction, and
   a flange extending in a radially outer direction from an axially outer end of the cylindrical portion, wherein
   the hub includes a core of metallic material that extends into the cylindrical portion and in the flange of the hub, and a covering body of plastic material applied over the core; wherein
   the core forms, as a single piece, a cylindrical core portion that extends in the axial direction and a core flange that extends in a radially outer direction from an axially outer end of the cylindrical core portion, the cylindrical core portion and the core flange defining the cylindrical portion and the flange of the hub, respectively; and wherein
   wheel mounting holes are formed through the core flange, and
   wherein the core flange is star shaped and is formed by a plurality of spokes uniformly arranged around a central rotation axis (x) of the hub and extend radially outwardly from the axially outer end of the cylindrical core portion, and
   wherein the spokes are circumferentially separated by gaps, and wherein the covering body substantially fills the gaps.

2. The hub according to claim 1, wherein the covering body embeds the core flange.

3. The hub according to claim 2, wherein the core flange provides anti-slip formations axially protruding and/or recessed with respect to the core flange, which formations are adapted to prevent relative rotation between the core and the covering body.

4. The hub according to claim 2, wherein the covering body covers a radially inner surface of the cylindrical core portion.

5. The hub according to claim 4, further comprising a tubular axial appendix protruding from the flange of the hub on an opposite side with respect to the cylindrical portion of the hub.

6. The hub according to claim 5, wherein the tubular axial appendix is formed by the covering body.

7. The hub according to claim 5, wherein each spoke has a root connected directly to the axially outer end and a free end portion connected to the corresponding root, each root and each free end portion being axially inwardly delimited by respective inner surfaces transverse to the central rotation axis (x), wherein the inner surface of the root is axially recessed with respect to the inner surface of the free end portion.

8. The hub according to claim 7, wherein each free end portion is axially outwardly delimited by a respective outer surface transverse to the central rotation axis (x) and parallel to the corresponding inner surface.

9. The hub according to claim 8, wherein each hole is formed through the inner and outer surfaces of the corresponding free end portion, which surfaces are coplanar and exposed with respect to a axially inner radial face and an axially outer radial face of the covering body.

10. A hub bearing assembly comprising:
    the hub according to claim 1; and
    at least one bearing mounted on the cylindrical portion.

11. The hub according to claim 1, wherein the covering body overlies a radially outer surface of each of the spokes.

12. A hub for a motor vehicle wheel, the hub comprising:
    a single piece metallic core, the core including a cylindrical portion having a radially outer surface and a plurality of spokes extending radially outwardly from an axial end of the core cylindrical portion, and
    a covering body of plastic material surrounding at least portions of the plurality of spokes and substantially filling circumferential gaps between adjacent pairs of the plurality of spokes,
    wherein a mounting hole is formed through each of the plurality of spokes.

13. The hub according to claim 12, wherein the covering body overlies a radially outer surface of each of the spokes.

14. The hub according to claim 12, wherein an axial surface around each of the mounting holes is not covered by the covering body.

* * * * *